2,982,767
Patented May 2, 1961

2,982,767
18-OXYGENATED PREGNANES

James F. Kerwin, Broomall, and Manfred E. Wolff, Elkins Park, Pa., assignors to Smith Kline & French Laboratories, Philadelphia, Pa., a corporation of Pennsylvania No Drawing. Filed May 23, 1960, Ser. No. 30,772

14 Claims. (Cl. 260—239.55)

This invention relates to novel 18-oxygenated steroids. More specifically it pertains to compounds having the fundamental steroidal nucleus of the pregnane, allopregnane, 19-norpregnane or 19-norallopregnane, and which in addition have an epoxide linkage between the carbon atom designated as C–11 and the carbon atom further possessing an oxygen function selected from the group consisting of hydroxyl and oxo.

In general, the compounds of our invention are of the group consisting of steroids having the following structural formula:

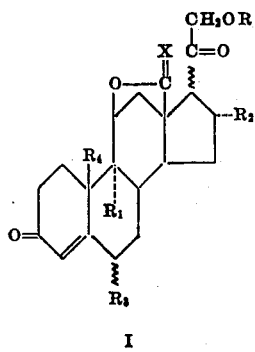

I wherein R is hydrogen or lower alkanoyl, $R_1$ is hydrogen or fluoro, $R_2$ and $R_4$ are methyl or hydrogen but not necessarily the same, $R_3$ is methyl, fluoro, or hydrogen, at least one of groups $R_1$, $R_2$ and $R_3$ being a substituent other than hydrogen, and X is (H, OH) or O; and the 1,2-bisdehydro analogs thereof.

The bonds represented by the symbol "⁞" indicate that both the α and β configuration of the groups so bound may be present and both configurations of these groups are embraced by the present invention when the bonds are so designated.

The compounds of our invention exhibit a high degree of diuretic activity, presumably by virtue of their ability to antagonize with the sodium retentive properties of aldosterone. They are thus valuable diuretic agents and are advantageously employed in congestive heart failure, premenstral tension, nephrosis, cirrhosis of the liver, toxemic of pregnancy and a variety of other edemic conditions.

The requisite starting materials for the preparation of our novel compounds are prepared according to procedures described in our copending application Serial No. 842,615 filed September 28, 1959, now U.S. Patent #2,959,586, of which this application is a continuation-in-part. According to our present invention, a diacylate of a 11,18-oxidopregnane-20,21-diol of Formula II is first oxidized at C–18 by treatment with ruthenium tetraoxide to form the 11-hydroxy-18-oic acid 11,18-lactone (III). Alternatively this oxidation is executed by treatment of the 11,18-oxido compound with ozone, the process for which is described in copending application Serial No. 23,631, filed April 21, 1960. Unsaturation in the A-ring is next introduced by methods well known to the art. Thus for example, treatment with bromine in acetic acid yields the 2,4-dibromo derivative in the allopregnene series or the 4-bromo derivative in the pregnane series. Subsequent treatment with sodium iodide and hydriodic acid or treatment with collidine then yields the 4-pregnene or 1,4-pregnadiene compounds respectively (IV). Alternatively the 1,4-pregnadienes may be prepared by methods well known to the art such as treatment with selenium dioxide.

The resulting 3-keto-11-hydroxy-20,21-diacyloxypregnen-18-oic acid 11,18-lactone and corresponding pregnadienes are next deacylated by mild hydrolysis such as with an alkali metal carbonate in aqueous methanol or ethanol and the resultant 20,21-diol (V) then converted to the 21-triphenylmethyl ether by treatment with chlorotriphenylmethane. The formation of this group (hereafter referred to as the "trityl" group) occurs specifically at the primary alcohol group at C–21.

Alternatively this hydroxyl group may be protected by selectively reacylated at C–21 by treatment with approximately one equivalent of an acyl anhydride or acyl chloride in the presence of a tertiary base such as pyridine.

The free hydroxyl group at C–20 is next oxidized to an oxo function employing chromium trioxide in acid solution to give the 3,20-diketo-11-hydroxy-21-triphenylmethyl-4-pregnene-18-oic acid 11,18-lactone (VII) or corresponding 1,4-pregnadiene.

The protective trityl group is then conveniently removed by treatment with refluxing 80% acetic acid and there is thus obtained 3,20-diketo-11,21-dihydroxy-4-pregnene-18-oic acid 11,18-lactone (VIII) or the corresponding 1,4-pregnadiene.

The 3,20-diketone thus obtained is then treated with an alkali metal bicarbonate or carbonate in refluxing methanol or with an alkali metal alcoholate. Under these conditions there is an equilibration of the C–17 side chain to the α and β configurations. These two isomers are readily separated by chromagraphic techniques to give 3,20 - diketo - 11,21-dihydroxy-4-isopregnene-18-oic acid 11,18-lactone (IXa) and 3,20-diketo-11,21-dihydroxy-4-pregnene-18-oic acid 11,18-lactone (IXb) or the corresponding 1,4-pregnadienes or 1,4-isopregnadienes.

Those compounds of our invention wherein X comprises hydroxyl are prepared directly by reduction of the 18-oxo group with lithium aluminum hydride. The carbonyl functions in positions 3 and 20 are advantageously protected through suitable means such as formation of the 3,20-bisethylenedioxy derivative through treatment with ethylene glycol under acidic conditions. The protective ethylenedioxy groups are then removed after the reductive step by the usual methods, such as for example, refluxing in mild acid, to yield the 3,20-diketo-11,18-oxido-11,21-dihydroxy derivative (XI).

Reacylation of the C–21 hydroxyl group may be executed in the usual manner such as treatment with one equivalent of a lower alkanoic acid chloride or anhydride (XII).

This reaction sequence may be summarized as follows:

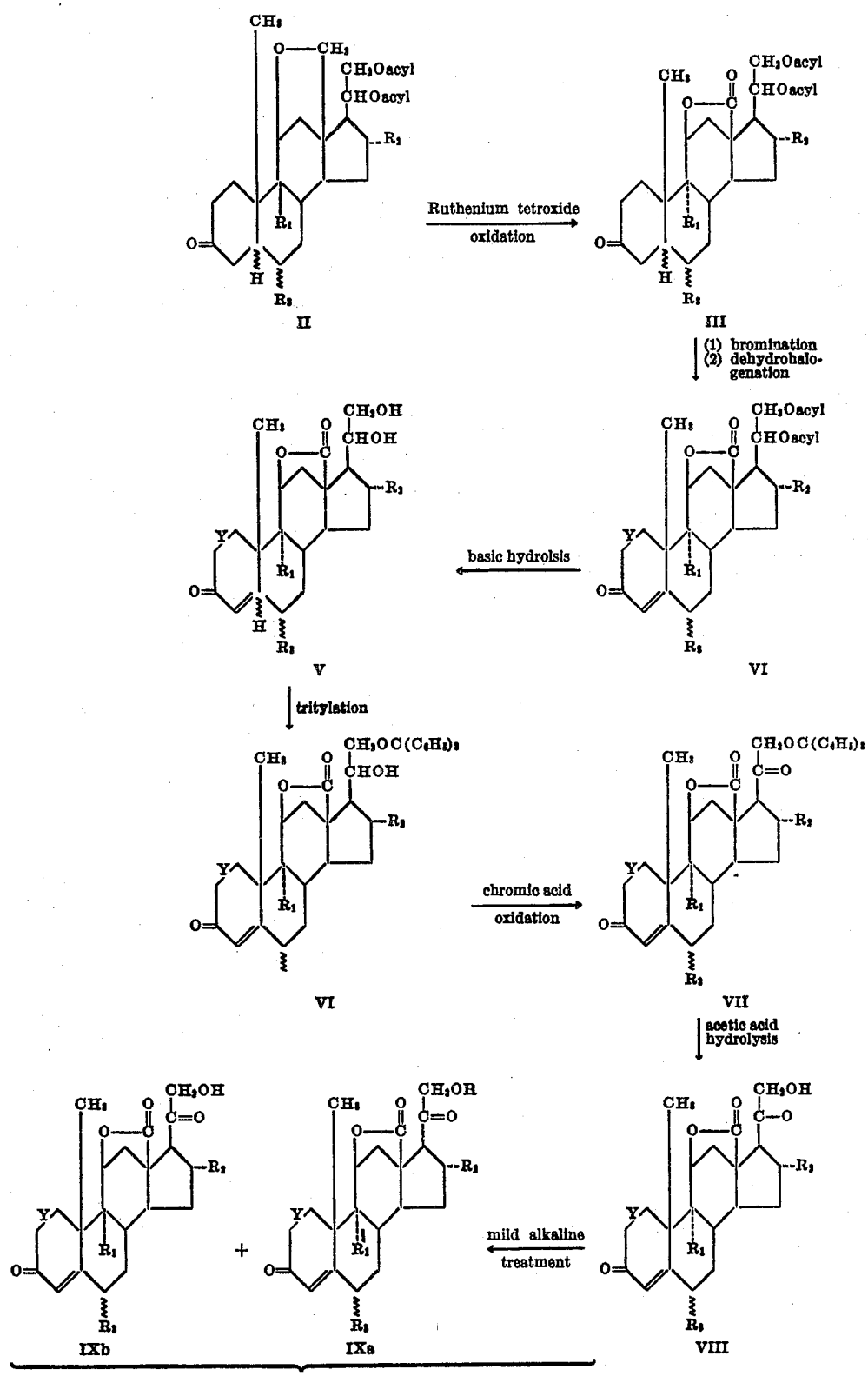

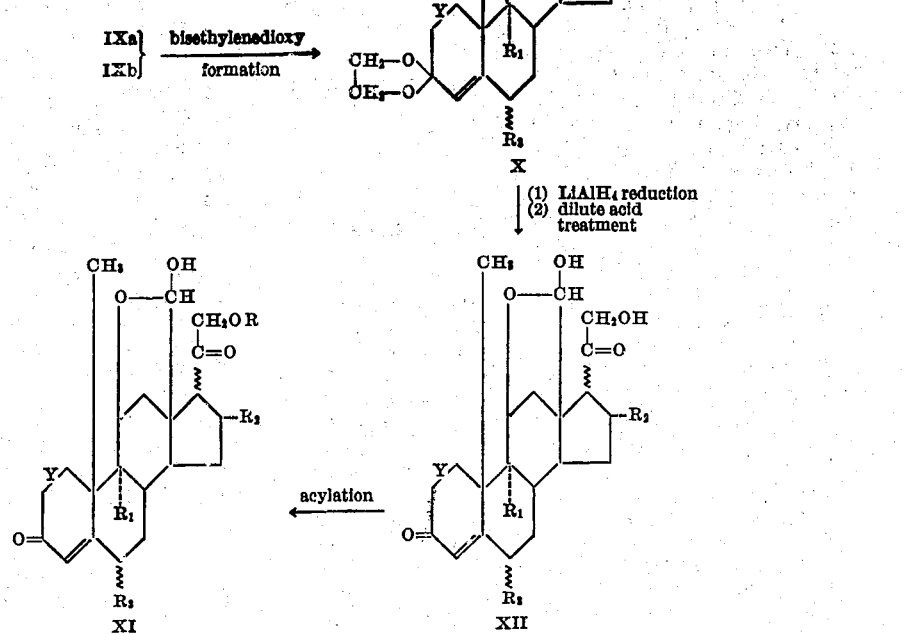

In the above reaction sequence, the groups R, $R_1$, $R_2$ and $R_3$ are as above defined. The symbol Y appearing between carbon atoms C–1 and C–2 represents a saturated carbon-carbon bond or a monounsaturated carbon bond. Thus the reactions on compounds so designated are applicable to both the 4-pregnenes and 1,4-pregnadienes.

Similarly although the above procedure exemplified the various reactions for compounds of the pregnane and allopregnane series, these reactions are equally applicable to 19-norpregnanes with the exception of formation of the 1,4 diene system, which, as is known to the art, results in aromatization of the A-ring in the 19-norpregnane series.

As stated above, the 21-esters of our novel compounds are also embraced within the scope of our invention. Representative of the acyl radicals which may thus be present are any of the pharmaceutically acceptable lower alkanoic acid radicals of less than 7 carbon atoms known to the art, as for example acetate, propionate, butyrate, t-butyrate and the like. These may be prepared according to the usual methods employed in the art.

The following examples, while not to be construed as defining the scope of this invention, will further serve to typify the manner of our invention.

Example 1

(A) A mixture of 10 g. of 6α-fluoro-11,18-oxido-20,21-dipropionyloxy allopregnane-3-one, a slight excess over the stoichiometric amount of ruthenium tetroxide in carbon tetrachloride is heated at reflux for 8 hours. The solution is filtered hot and then allowed to cool. Evaporation of the cooled solution or residue yields 3-keto-6α-fluoro-11β-hydroxy-20,21-dipropionyloxy allopregnane-18-oic acid 11,18-lactone.

(B) A stirred solution of 9.6 g. of 3-keto-6α-fluoro-11β-hydroxy-20,21-dipropionyloxy allopregnane-18-oic acid 11,18-lactone, in 120 ml. of acetic acid is treated with 34 ml. of 1.79 M hydrogen bromide in acetic acid and then with 4.95 g. of bromine in 25 ml. of acetic acid. After 10 minutes the solution is poured into 1.1 of water and the solid dibromide separated by filtration. This product is then added to a suspension prepared by dissolving 4.44 g. of bromine in 42 ml. of acetone, adding 3.4 g. of sodium carbonate stirring and filtrating, and then adding 40 g. of sodium iodide followed by a brief reflux period. The resulting mixture is stirred for 2½ hours, then 7.4 g. of oxalic acid dehydrate is added followed by refluxing for 1 hour. Ethyl acetate (400 ml.) and 1.1 of water are added and the layers separated. The organic layer is washed with water, 5% aqueous sodium bicarbonate, and again with water. The washed organic layer is then stirred with 70 g. of zinc dust and 2 ml. of acetic acid is filtered and washed again. The filtrate is then evaporated to a solid which is dissolved in 80 ml. of ethanol and acidified with 6 ml. of acetic acid. After addition of 3 g. of Girard's Reagent "T," the solution is boiled for 30 minutes, cooled to 20° C., treated with 37% formaldehyde and allowed to stand for 25 minutes. At the end of this time the mixture is extracted with ethyl acetate and the aqueous layer acidified to pH 1 and allowed to stand for 2 hours after which time it is also extracted with ethyl acetate. The second ethyl acetate extract is washed, dried and evaporated to give 3-keto-6α-fluoro-11β-hydroxy-20,21-dipropionyloxy-4-pregnene-18-oic acid 11,18-lactone.

(C) A mixture of 3-keto 6α-fluoro-11β-hydroxy-20,21-dipropionyloxy-4-pregnene-18-oic acid 11,18-lactone and a solution of 350 ml. of aqueous methanol containing 3 g. of potassium bircarbonate and 5 g. of potassium carbonate is reacted for 12 hours and is then quenched with water. The solid which thus forms is collected by filtration and dried to yield 3-keto-6α-fluoro-11,20,21-triol-4-pregnene-18-oic acid 11,18-lactone. To a solution of 4.2 g. of this compound in 200 ml. of dry pyridine is added 3.6 g. of chlorotriphenylmethane and the mixture stirred for 72 hours at room temperature. To the mixture is then added 5 ml. of water and the mixture reduced to a residue under reduced pressure. This residue is dissolved in 100 ml. of methylene chloride and the resultant solution washed with 10% hydrochloric acid, water, sodium bicarbonate and finally with water. The washed solution is then dried over sodium sulfate and the solvent removed by evaporation and residue recrystallized from methanol to yield 3-keto-6α-fluoro-11,20 - dihydroxy - 21´- triphenylmethoxy - 4 - pregnene-18-oic acid 11,18-lactone. This compound is then treated with 90 mg. of chromic acid in 2 ml. of acetic acid and 2 ml. of water. After 2 hours a small amount of ethanol was added and the reaction mixture is quenched with water. The solid is collected by filtration and dried to yield 3,20-diketo-6α-fluoro-11β-hydroxy - 21 - triphenylmethoxy-4-pregnene-18-oic acid 11,18-lactone.

In a similar fashion by employing 3 - keto - 6β - fluoro-11,18 - oxido-20,21-dipropionyloxy allopregnane in the above reaction procedure, there is obtained 3,20-diketo-6β - fluoro - 11β - hydroxy - 21 - triphenylmethoxy - 4 - pregnene-18-oic acid 11,18-lactone.

(D) Two grams of 3,20 - diketo - 6α - fluoro - 11β - hydroxy - 21 - triphenylmethoxy - 4 - pregnene - 18 - oic acid 11,18-lactone is refluxed for thirty minutes with 60 ml. of 80% acetic acid. The solution is then diluted with 400 ml. of water and cooled to 10° C. The solution is filtered and the filtrate saturated with sodium chloride and extracted with chloroform. The chloroform extract is then washed with water, dried and evaporated to yield 3,20 - diketo - 6α - fluoro - 11β,21-dihydroxy-4-pregnene-18-oic acid 11,18-lactone.

One gram of 3,20 - diketo - 6α - fluoro - 11β,21 - dihydroxy-4-pregnene-18-oic acid 11,18 - lactone is treated with .05 g. of sodium dissolved in 50 ml. of anhydrous methanol at reflux for 1 hour. The mixture is then diluted with water and the methanol removed by evaporation under reduced pressure. The resultant solution is then extracted with methylene chloride and the organic extracts dried over sodium sulfate. The dried methanol chloride solution is reduced to a residue and the solid thus obtained placed on alumina chromatographic column and eluted with benzene following by benzene containing increasing quantities of ether. There is thus obtained the separate isomeric compounds 3,20 - diketo - 6α - fluoro - 11β,21 - dihydroxy - 4 - isopregnene - 18 - oic acid 11,18-lactone and 3,20 - diketo - 6α - fluoro - 11β,21-dihydroxy-4-pregnene-18-oic acid 11,18-lactone.

In a similar manner the 6β-fluoro isomer be subjected to this procedure obtaining 3,20 - diketo - 6β - fluoro-11β, 21 - dihydroxy - 4 - isopregnene-18-oic acid 11,18-lactone and 3,20 - diketo - 6β - fluoro - 11β,21 - dihydroxy - 4 - pregnene-18-oic acid 11,18-lactone.

*Example 2*

A solution of 1.2 g. of 3,20-diketo-6α-fluoro-11β,21-dihydroxy-4-pregnene-18-oic acid 11,18-lactone, 250 ml. of ethylene glycol and 60 mg. of p-toluene sulfonic acid is heated at 80° C. under 0.2 mm. pressure until the volume is reduced to 50 ml. The product is isolated by extraction with chloroform and concentration of the chloroform extracts to a solid residue. A solution of 900 mg. of the 3,20-bisethylene compound in 100 ml. of purified dioxane is treated dropwise with 1.5 g. of lithium aluminum hydride in 150 ml. of anhydrous ether. The mixture is heated at reflux for 15 minutes and cautiously treated with the 7 ml. of water. The reaction mixture is filtered and evaporated to give the hemi-acetal. One gram of this compound in 20 ml. of dioxane is treated with 2 ml. of concentrated hydrochloric acid and 10 ml. of water. After standing for 4 hours, the mixture is diluted with water and filtered to give 3,20-diketo-6α-fluoro-11,18-oxido-4-pregnene-18,21-diol.

In a similar manner the 6α-fluoro-4-isopregnene-11,18-lactone may be subjected to the above procedure and there is thus obtained 3,20-diketo-6α-fluoro-11,18-oxido-4-isopregnene-18,21-diol. Likewise the 6β-fluoro isomers of both the 4-pregnene and 4-isopregnene compounds may be reduced according to this procedure, obtaining the compounds 3,20-diketo-6β-fluoro-11,18-oxido-4-pregnene-18,21 - diol and 3,20 - diketo-6β-fluoro-11,18-oxido-4-isopregnene-18,21-diol.

*Example 3*

3-keto-6β-methyl-11,18-oxido-20,21-diacetoxy-pregnane is subjected to the reaction procedure described in Example 1 part A. Upon completion of the steps therein described, there is obtained 3-keto-6β-methyl-11β-hydroxy-20,21-diacetoxypregnane-18-oic acid 11,18-lactone. Three grams of this compound in dimethylformamide are treated dropwise with one molar equivalent of bromine in dimethylformamide until the bromine color persists. The mixture is then quenched in water and filtered. The solid thus collected is heated with collidine to give 3-keto-6β-methyl - 11β - hydroxy - 20,21 - diacetoxy - 4 - pregnene-18-oic acid 11,18-lactone. The compound is then subjected to the reaction procedures of parts C and D of Example 1. Upon completion of the steps therein recited and purification in the prescribed manner, there are obtained 3,20-diketo-6β-methyl-11β,21-dihydroxy-4-pregnene-18-oic acid 11,18-lactone and 3,20-diketo-6β-methyl-11β,21-dihydroxy-4-isopregnene-18-oic acid 11,18-lactone.

These compounds when subjected to the procedure prescribed in Example 2, are then converted to 3,20-diketo-6β-methyl-11,18-oxido-4-pregnene-18,21-diol and the corresponding 4-isopregnene.

*Example 4*

By employing equivalent amounts of 3-keto-11,18-oxido-16α-methyl-20,21-diacetoxypregnane in the procedure of Example 3 there are obtained upon completion of the steps therein recited the compounds 3,20-diketo-11β, 21-dihydroxy-16α-methyl-4-pregnene-18-oic acid 11,18-lactone and 3,20-diketo-11β,21-dihydroxy-16α-methyl-4-isopregnene-18-oic acid 11,18-lactone. These compounds are then subjected to the reaction procedure of Example 2 and there are thus obtained 3,20-diketo-11,18-oxido-16α-methyl-4-pregnene-18,21-diol and the corresponding 4-isopregnene.

*Example 5*

3 - keto-9α-fluoro-11,18-oxide-20,21-diacetoxyallopregnane (10 g.) is subjected to the conversions described in Example 1. Completion of these steps then yields the desired 3,20 - diketo - 9α-fluoro-11β,21-dihydroxy-4-pregnene-18-oic acid 11,18-lactone and 3,20-diketo-9α-fluoro-11β,21-dihydroxy-4-isopregnene-18-oic acid lactone. This compound is then subjected to the reaction procedures of Example 2 and there are thus obtained 3,20-diketo-9α-fluoro-11,18-oxido-4-pregnene-18,21-diol and the corresponding 4-isopregnene.

*Example 6*

3-keto-11,18-oxido-20,21-diacetoxy-19-norallopregnane is subjected to the reaction procedure of Example 1 and there is obtained upon purification in the prescribed manner 3,20-diketo-11β,21-dihydroxy-19-nor-4-pregnene-18-oic acid 11,18-lactone and the corresponding 4-isopregnene. These compounds are then subjected to the reaction procedure of Example 2 and there are thus obtained the compounds 3,20-diketo-11,18-oxido-19-nor-4-pregnene-18,20-diol and the corresponding 4-isopregnene.

In a similar manner 3-keto-6α-fluoro-11,18-oxido-20,21-diacetoxy-19-norallopregnane is subjected to the procedures of Example 1 and there is obtained the compounds 3,20 - diketo - 6α-fluoro-11β,21-dihydroxy-19-nor-4-pregnene-18-oic acid 11,18-lactone and the corresponding 4-isopregnene. Further transformations according to the procedures of Example 2 then yields 3,20-diketo-6α-fluoro-11,18-oxido-19-nor-4-pregnene-18,21-diol and the corresponding 4-isopregnene.

Example 7

A solution of 3 g. of 3-keto-11β-hydroxy-16α-methyl-20,21-diacetoxyallopregnane-18-oic acid 11,18-lactone (obtained via the ruthenium tetroxide oxidation performed in Example 4) in 150 ml. of t-butanol containing 1.5 ml. of glacial acetic acid is treated with 0.9 g. of selenium dioxide by refluxing for 24 hours under nitrogen. An additional 900 mg. of selenium dioxide is added and the reflux period repeated. The suspension is filtered and the filtrate evaporated. The filtrate residue is dissolved in ethyl acetate and the solution washed with successive portions of 5% potassium bicarbonate solution, water ammonium sulfate solution, cold 5% ammonium hydroxide solution, water and 1% hydrochloric acid. The residue is dried and reduced to a residue to yield 3-keto-11β-hydroxy-16α-methyl-20,21-diacetoxy-1,4-pregnadiene-18-oic acid 11,18-lactone. This compound is then subjected to the procedure of parts C and D of Example 1 and there are thus obtained 3,20-diketo-11β,21-dihydroxy-16α-methyl-1,4-pregnadiene-18-oic acid 11,18-lactone and 3,20-diketo-11β,21-dihydroxy-16α-methyl-1,4-isopregnadiene-18-oic acid 11,18-lactone.

Alternatively the 1,4-diene system is introduced by the following method. 3 - keto - 4-bromo-11β-hydroxy-16α-methyl-20,21-diacetoxypregnane-18-oic acid 11,18-lactone (1 g.) (prepared as an intermediate in Example 4) is treated with one molar equivalent of bromine as described in Example 1. The resultant dibromo compound is reacted with 15 ml. of collidine at reflux for 45 minutes. Ether is added to the cooled mixture and the ethereal extracts washed with dilute sulfuric acid, water, and dried. This dried solution is then reduced to a residue comprising 3-keto-11β-hydroxy-16α-methyl-20,21-diacetoxy-1,4-pregnadiene-18-oic acid 11,18-lactone.

In a similar fashion the 1,4-diene systems are introduced via one of these methods and products treated according to Example 1 parts C, D and there are thus obtained the following compounds: 3,20-diketo-6α-fluoro-11β,21-dihydroxy-1,4-pregnadiene-18-oic acid 11,18-lactone; 3,20-diketo-6α-fluoro-11β,21-dihydroxy-1,4-isopregnadiene-18-oic acid 11,18-lactone; 3,20-diketo-9α-fluoro-11β,21-dihydroxy-1,4-pregnadiene-18-oic acid 11,18-lactone; and 3,20-diketo-9α-fluoro-11β,21-dihydroxy-1,4-isopregnadiene-18-oic acid 11,18-lactone; 3,20-diketo-6β-methyl-11β,21-dihydroxy-1,4-pregnadiene-18-oic acid 11,18-lactone; and 3,20-diketo-6β-methyl-11β,21-dihydroxy-1,4-isopregnadiene-18-oic acid 11,18-lactone.

The resultant 1,4-pregnadiene-11,18-lactones may then be reduced according to the procedure of Example 2. There are thus obtained the following compounds: 3,20-diketo - 6α-fluoro-11,18-oxido-1,4-pregnadiene-18,21-diol; 3,20 - diketo-6α-fluoro-11,18-oxido-1,4-isopregnadiene-18,21-diol; 3,20 - diketo-9a-fluoro-11,18-oxido-1,4-pregnadiene-18,21-diol; 3,20-diketo-9α-fluoro-11,18-oxido-1,4-isopregnadiene - 18,21 - diol; 3,20 - diketo-6β-methyl-11,18-oxido - 1,4 - pregnadiene-18,21-diol; and 3,20-diketo-6β-methyl-11,18-oxido-1,4-isopregnadiene-18,21-diol.

Example 8

One gram of 3,20-diketo-6α-fluoro-11,18-oxido-4-pregnene-18,21-diol is dissolved in pyridine and 0.36 g. of propionic anhydride is then added. The mixture is allowed to stand overnight and then quenched with water. The solid is collected by filtration and dried to yield 3,20-diketo - 6α - fluoro-11,18-oxido-4-pregnene-18,21-diol-21-propionate.

In a similar manner one equivalent of other lower alkanoic acid anhydrides may be employed in the above procedure to form the corresponding 21-lower alkanoates. Similarly other 4-pregnenes, 4-isopregnenes, 1,4-pregnadienes, or 1,4-isopregnadienes are subjected to the above procedure with the appropriate lower alkanoic acid anhydride and there is obtained the desired lower alkanoate. There are thus obtained for example, 3,20-diketo-6β-fluoro-11,18-oxido-4-pregnene-18,21-diol-21-acetate; 3,20-diketo - 11,18-oxido-4-isopregnene-18,21-diol-21-butyrate; 3,20 - diketo - 11,18-oxido-1,4-pregnadiene-18,21-diol-21-acetate and the like.

Example 9

3,20 - diketo-11β,21-dihydroxy-16α-methyl-4-pregnene-18-oic acid 11,18-lactone (1 g.) is subjected to the reaction procedure of Example 8 and there is thus obtained upon purification in the prescribed manner, 3,20-diketo-16α - methyl - 11β-hydroxy-21-propionyloxy-4-pregnene-18-oic acid 11,18-lactone.

In a similar fashion other lower alkanoic acid anhydrides and/or other pregnenes, isopregnenes, pregnadienes or isopregnadienes may be employed in this procedure. There is thus prepared for example, 3,20-diketo-6α-fluoro-11β-hydroxy-21-acetoxy-4-pregnene-18-oic acid 11,18-lactone; 3,20-diketo-11β-hydroxy-21-propionyloxy-4-pregnene-18-oic acid 11,18-lactone; 3,20-diketo-9α-fluoro - 11β-hydroxy-21-butyryloxy-1,4-pregnadiene-18-oic acid 11,18-lactone.

We claim:
1. 3,20-diketo-6-fluoro-11β,21 - dihydroxy - 1,4-pregnadiene-18-oic acid 11,18-lactone.
2. 3,20-diketo-6-fluoro-11,18 - oxido - 1,4 - pregnadiene-18,21-diol.
3. 3,20-diketo-11β,21-dihydroxy-16α-methyl-1,4-pregnadiene-18-oic acid 11,18-lactone.
4. 3,20-diketo-11,18-oxido-16α-methyl-1,4-pregnadiene-18,21-diol.
5. 3,20-diketo-9α-fluoro-11β,21-dihydroxy-1,4 - pregnadiene-18-oic acid 11,18-lactone.
6. 3,20-diketo-9α-fluoro-11,18-oxido-1,4 - pregnadiene-18,21-diol.
7. 3,20-diketo-11β,21-dihydroxy-19-nor - 4 - pregnene-18-oic acid 11,18-lactone.
8. 3,20-diketo-11,18-oxido-19-nor-4 - pregnene - 18,21-diol.
9. 3,20-diketo-6α-fluoro-11β,21-dihydroxy - 19 - nor - 4-pregnene-18-oic acid 11,18-lactone.
10. 3,20-diketo-6α-fluoro-11,18-oxido-19-nor - 4 - pregnene-18,21-diol.
11. 3,20-diketo-6β-methyl-11β,21-dihydroxy-1,4 - pregnadiene-18-oic acid 11,18-lactone.
12. 3,20-diketo-6β-methyl-11,18 - oxido - 4 - pregnene-18,21-diol.
13. 3,20-diketo-6β-methyl-11,18-oxido-1,4 -pregnadiene-18,21-diol.
14. 3,20-diketo-11,18-oxido-16α-methyl-4-isopregnene-18,21-diol.

References Cited in the file of this patent

UNITED STATES PATENTS

| | | |
|---|---|---|
| 2,838,542 | Spero et al. | June 10, 1958 |
| 2,838,548 | Magerlein et al. | June 10, 1958 |
| 2,867,632 | Lincoln et al. | Jan. 6, 1959 |
| 2,875,200 | Hogg et al. | Feb. 24, 1959 |
| 2,897,218 | Sebek et al. | July 28, 1959 |
| 2,934,543 | Reichstein et al. | Apr. 26, 1960 |

OTHER REFERENCES

Wieland et al.: (1) Helv. Chim. Acta 41, 316–440 (1958), pages 419 and 424 are depended upon.

Wieland et al.: (2) Helv. Chim. Acta 43, 617–623 (1960), pages 617 and 618 depended upon.

Heusler et al.: Experientia 16, 21–24 (Jan. 1, 1960).